US008943171B2

(12) United States Patent
O'Mara et al.

(10) Patent No.: US 8,943,171 B2
(45) Date of Patent: Jan. 27, 2015

(54) LOCATION-AWARE WEB SERVICE-BASED APPLICATION SKINNING FOR WEB APPLICATIONS

(75) Inventors: Jordan S. O'Mara, Raleigh, NC (US); Grant R. Gainey, Cary, NC (US); Brenton T. Leanhardt, Greenville, NC (US)

(73) Assignee: Red Hat, Inc., Raleigh, NC (US)

( * ) Notice: Subject to any disclaimer, the term of this patent is extended or adjusted under 35 U.S.C. 154(b) by 79 days.

(21) Appl. No.: 13/483,260

(22) Filed: May 30, 2012

(65) Prior Publication Data

US 2013/0326023 A1 Dec. 5, 2013

(51) Int. Cl.
*G06F 15/16* (2006.01)

(52) U.S. Cl.
USPC ............ 709/219; 709/223; 709/224; 345/619

(58) Field of Classification Search
CPC ..... G06F 9/4448; G06F 9/4443; G06F 9/445; G06F 17/30861; G06F 17/30867; G06F 17/30699; G06F 11/3037
USPC .............. 709/203, 205, 223, 219, 224; 707/3; 345/619, 633
See application file for complete search history.

(56) References Cited

U.S. PATENT DOCUMENTS

| | | | |
|---|---|---|---|
| 7,240,192 B1* | 7/2007 | Paya et al. ..................... | 713/152 |
| 7,624,160 B2* | 11/2009 | Henderson et al. ............ | 709/219 |
| 8,793,804 B2* | 7/2014 | Bekker et al. .................... | 726/26 |
| 2003/0126136 A1* | 7/2003 | Omoigui ........................ | 707/10 |
| 2005/0256940 A1* | 11/2005 | Henderson et al. ........... | 709/219 |
| 2007/0043766 A1* | 2/2007 | Nicholas et al. ............ | 707/104.1 |
| 2007/0078835 A1* | 4/2007 | Donnelli ............................ | 707/3 |
| 2008/0033646 A1* | 2/2008 | Morgan et al. ................ | 701/213 |
| 2008/0127158 A1* | 5/2008 | Carlos ............................ | 717/168 |
| 2009/0063634 A1* | 3/2009 | Faus et al. ..................... | 709/205 |
| 2009/0064131 A1* | 3/2009 | Ferris et al. ................... | 717/174 |
| 2010/0070448 A1* | 3/2010 | Omoigui .......................... | 706/47 |
| 2011/0208862 A1* | 8/2011 | Maffione et al. .............. | 709/224 |
| 2011/0302288 A1* | 12/2011 | Davis ............................ | 709/223 |
| 2012/0089674 A1* | 4/2012 | Staykoff ........................ | 709/203 |
| 2012/0191716 A1* | 7/2012 | Omoigui ........................ | 707/740 |
| 2013/0044129 A1* | 2/2013 | Latta et al. ..................... | 345/633 |
| 2013/0271488 A1* | 10/2013 | Stirbu et al. ................... | 345/619 |

OTHER PUBLICATIONS

Oracle Fusion Middleware Web User Interface Developer's Guide for Oracle Application Development Framework 11gRelease 1 (11.1.1), Chapter 20, "Customizing the Appearance Using Styles and Skins", 28 pages, 2009 http://docs.oracle.com/cd/E16764_01/web.1111/b31973/af_skin.htm.

(Continued)

*Primary Examiner* — Thu Ha Nguyen
(74) *Attorney, Agent, or Firm* — Lowenstein Sandler LLP (57) ABSTRACT

A mechanism for location-aware web service-based application skinning for web applications is disclosed. A method includes identifying, by a server device, a locale of an originator of a request for a web page of a web application hosted by the server device, obtaining skinning files associated with a combination of the web application and the identified locale; and rendering, in response to the request, the web page comprising the skinning files, wherein the skinning files provide a language and style to a user interface (UI) of the web page based on the identified locale that is separate from a development of the web application.

20 Claims, 4 Drawing Sheets

(56) References Cited

OTHER PUBLICATIONS

Oracle Application Development Framework Developer's Guide 10g Release 3 (10.1.3), Chapter 14.3 "Using Skins to Change the Look and Feel", 9 pages, 2006 http://docs.oracle.com/cd/B25221_04/web.1013/b25386/web_laf003.htm.

Mozilla Developer Network, "Chrome registration", 15 pages, last modified on Oct. 14, 2011 https://developer.mozilla.org/en/Chrome_Registration.

* cited by examiner

LOCATION-AWARE WEB SERVICE-BASED APPLICATION SKINNING FOR WEB APPLICATIONS

TECHNICAL FIELD

The embodiments of the invention relate generally to web applications and, more specifically, relate to a mechanism for location-aware web service-based application skinning for web applications.

BACKGROUND

A web application is an application that is accessed over a network, such as the Internet or an intranet. The web application may be a computer software application that is coded in a browser-supported language (such as JavaScript, combined with a browser-rendered markup language like Hypertext Markup Language (HTML)) and reliant on a common web browser to render the application executable.

A web application includes a user interface (UI) having design elements that give the web application a "look and feel". The web application UI's appearance, or "look and feel", is sometimes referred to as a web skin. In particular, a web skin affects the way a user interface appears when a user clicks a button, but does not change the UI's behavior. A change in the web skin thus results in a change in an application's appearance, but not its behavior.

Many different web applications may be developed and implemented within a single organization. In some cases, the web applications may be developed by third parties outside of the organization. In other cases, the web application may be developed for multiple different global locations of the organization. In yet other cases, the web applications may be developed for different departments or groups with in the organization. In these cases, a consistent "look and feel" (i.e., web skin) for the web applications is important for branding purposes and a good customer experience.

A current approach to maintaining a consistent "look and feel" for web applications within an organization is to have the developer download web skin code, which includes images, Cascading Style Sheets (CSS), JavaScript, etc. and apply that web skin to the web application. However, this solution can be problematic for many reasons. One reason is because the manual intervention by the developer, i.e., to obtain and apply the web skin code to the web application, can be time consuming and inefficient. Another reason is because the organization loses control over the application of the web skin code to the web application as this is a manual step that the web application developer should perform. In addition, the web skin code for the organization is not resistant to changes that the developed may make to the "look and feel" which could ultimately lead to inconsistencies in the overall "look and feel" presentation for the organization.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for location-aware web service-based application skinning for web applications. A method of embodiments of the invention includes identifying, by a server device, a locale of an originator of a request for a web page of a web application hosted by the server device, obtaining skinning files associated with a combination of the web application and the identified locale; and rendering, in response to the request, the web page comprising the skinning files, wherein the skinning files provide a language and style to a user interface (UI) of the web page based on the identified locale that is separate from a development of the web application.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "executing", "identifying", "obtaining", "applying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a mechanism for location-aware web service-based application skinning for web applications. In one embodiment, an application package provided to web application developers allows the developer's web application to show custom web skins served from a remote web service. Each custom web skin is locale-aware and subject to a caching with a configurable timing strategy. Embodiments of the invention dynamically automate the "look and feel" aspects of the web application so that the developer does not have to code these pieces, and allows for easy internationalization and consistent branding of a web application in a customer-specific way.

Figure 1:
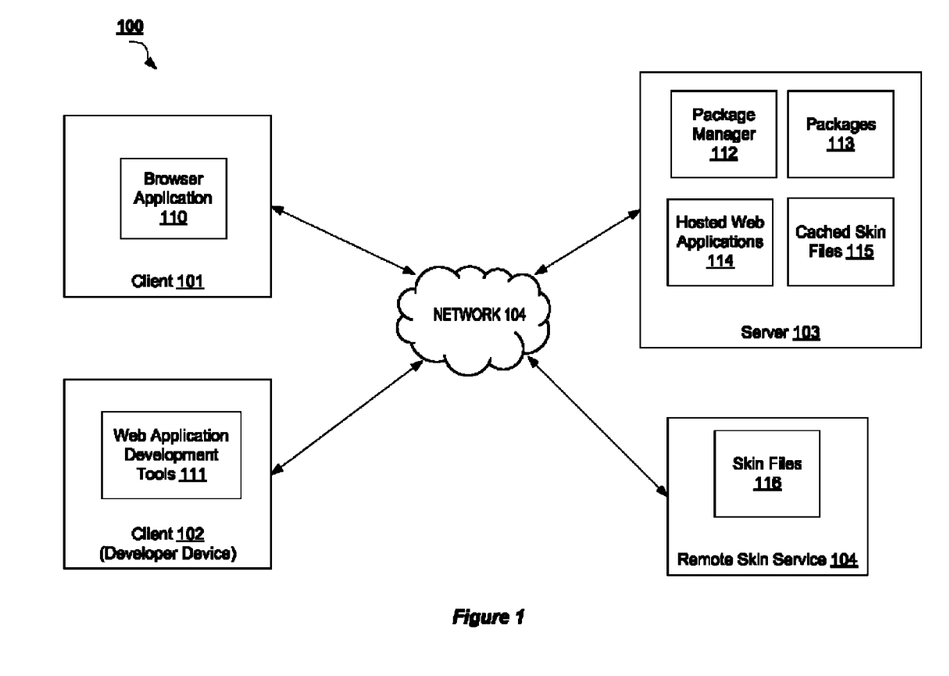
FIG. 1 is a block diagram illustrating a network system which may be used with an embodiment of the invention.

FIG. 1 is a block diagram illustrating a network system which may be used with an embodiment of the invention. Referring to FIG. 1, system 100 includes, but is not limited to, one or more clients 101 communicatively coupled to one or more servers 103 over a network 104, which may be a local area network (LAN), a wide area network (WAN) such as Internet, or a combination of both. Network 104 may be a wired network, a wireless network, or a combination of both.

Clients 101-102 may comprise any variety of end user devices, such as a personal computer (PC), a laptop, a mobile phone, mobile smart phone, a tablet computer, handheld devices, netbooks, or any other computing device. Furthermore, clients 101-102 may comprise a server device of an organization. Servers 103 may be any kind of application and/or distribution servers that are used to host web applications and distribute software packages for download and installation. For example, servers 103 may be management servers such as Red Hat® management servers (e.g., Red Hat Network™ or Red Hat virtualization management server) available from Red Hat, Inc. of Raleigh, N.C.

In one embodiment, client 102 is a device used by a third-party web application developer. Client 102 includes web application development tools 111 to assist a developer using client 102 in the creation and development of a web application to be hosted by server 103. In one embodiment, the developer at client 102 obtains, installs, and configures a web app skinning application package into the web application he/she is developing, where the web app skinning application package implements a location-aware skinning service for the web application. The developer utilizes the web app skinning application package to separate the application development from the "look and feel" development of the web application. The developer is responsible for installing a library from the web app skinning application package into the web application and configuring the URL of a skin service 104 in the web application that provides the "look and feel" files for the web application, but is otherwise not responsible for developing the "look and feel" of the web application.

In one embodiment, the developer at client 102 obtains the web app skinning application package from server 103. Server 103 may include a package manager 112 (e.g., a server module of a package management system) for managing and distributing a variety of software packages 113. Package manager 112 is responsible for authorizing and/or authenticating a client, such as clients 101-102 for the purpose of distributing software packages 113 to the client. In one embodiment, package manager 112 is implemented as part of Red Hat package management (RPM™) system. In other embodiments, package manager 112 is a Windows™ update component, Mac OS™ component, or any other components providing updates for a specific operating system (OS).

In one embodiment, the web app skinning application package provided from package manager 112 is provided to the developer as a rubygem, which is a package in a self-contained format for the Ruby programming language, which includes the package information along with the files and libraries to install. In one embodiment, the rubygem is built into an RPM and the developer downloads the rubygem from the RPM file repository. Installing the RPM package provides the rubygem to the developer. In another embodiment, the developer can check the rubygem out from a source (on an internal source repository) and build the rubygem themselves. The developer can download a file from a source code repository that has instructions on how to create the rubygem from the source.

Once the web app skinning application package is installed in the web application, the developer then configures settings in a text file of the application package for the specific environment of the web application development. In one embodiment, the settings are established with default values that can be changed by the developer or an administrator. For example, the settings can be configured with a Uniform Resource Locator (URL) of the remote skin service 104 that provides the "look and feel" files 116 for the web application. In one embodiment, the remote skin service 104 is a chrome service designed to serve the skin files 116. In one embodiment, the skin service 104 is internal to the organization running the server(s) 103 providing the web app skinning application package and the web application hosting services. The remote skin service 104 may be part of server 103 or may be executed on a separate server (not shown) of the organization.

In some embodiments, remote skin service 104 is provided from a third-party organization that is different than the organization running server 103. Remote skin service 104 may serve one or more skin files 116 that contain the CSS, JavaScript, and images that provide the "look and feel" aspects of a web page. In one embodiment, a skin file 116 may have multiple locale versions of the skin file. For instance, the skin service 104 may provide a skin file 116 providing a "look and feel" for a US-based customer and a skin file 116 providing a similar "look and feel" but for a Chinese-based customer. As such, a single web page may have multiple different skin files associated with it based on the locale of a requesting customer.

The developer also configures the web application to consume the various "look and feel" pieces of skin files 116 that the remote skin service 104 hands the web application. For example, when building pages in a web application, the pages typically include a header, a body, and a footer. The remote skin service 104 will have a particular way of delivering the skinning for each of these pieces. As a result, the web application is configured to conform to being able to consume the header, body, and footer skinning files as provided by the remote skin service 104.

Once the web app skinning application is installed and configured by the developer and the web application is ready for deployment, the web application is provided to server 103 for web application hosting. In one embodiment, the finalized web application is hosted 114 by server 103 for access and use by multiple customers. Although depicted as hosted on a same server 103 as the package manager 112 and packages 113, the web application may be hosted on a different server than the server 103 providing the package manger 112 and packages 113 in some embodiments of the invention. In one embodiment, when the web application is installed on server 103, the configuration settings of the web app skinning application package are under the control of a system administrator of server 103. As a result, an administrator of the server 103 can change the URL of the remote skin server 104 to access, a cache timeout setting of the web app skinning service, and so on.

When the web application is installed and running at server 103, the web application 114 can then receive customer requests from one or more clients 101 to access services provided by the web application 114. An end user may interact with the web application 114 hosted at server 103 using an application, such as a browser application 110, executing on client 101. In one embodiment, the browser application 10 may include any commonly-available Internet browser, such as Firefox™, Google™ Chrome, Safari™, or Internet Explorer™.

In one embodiment, an application controller component (not shown) of the hosted web application 114 receives an incoming request for a web page of the web application 114 and determines how to response to the request. The application controller determines that there is a web app skinning service (previously installed by the developer as described above) that is part of the hosted web application and performs the logic of the web app skinning service.

In one embodiment, the web app skinning service logic of web application receives the customer request and determines a locale of the customer. The locale may be a set of parameters that define the customer's language, country, and other region-specific parameters, such as units of measurement, time zone, date/time presentation, reading direction (left-to-right or right-to-left), that affect how a user interface may be presented to the customer. In addition, locale can also narrow down specifics of a language of the customer to include a dialect of the language, such as American English, British English, Simplified Chinese, Traditional Chinese, Localized Japanese, and so on. In embodiments of the invention, one or both of server device 103 and remote skin service 104 may maintain parameter sets for a plurality of possible locales, where these parameter sets identify the information that is common to the particular locale.

In one embodiment, the locale may be determined from a cookie associated with the browser application 110 sending the request. In another embodiment, the locale may be determined from a configuration setting of the browser application 110. Further description of determining the locale of the customer is discussed below with respect to FIG. 3. If a local cannot be determined from the browser application 110, then a default locale setting may be used. In one embodiment, the default locale is American English.

The determined locale data is then used to decide whether any skin files corresponding to the locale have been cached 115 locally on server 103. A skin file 116 is cached locally 115 on server 103 when the web application 114 makes a request to remote skin server 104 for the skin file 116. If the skin file 116 for the locale is locally cached 115 at the server 103, then the application controller determines, based on cache timeout configuration settings of the web app skinning service, whether the cached skin file 115 satisfies the cache timeout limits (e.g., has not been cached longer than the time limits set in the configuration settings). If the cached skin file 115 is "fresh" enough (e.g., has not timed out), then the application controller uses the locally-stored skin files 115 for the "look and feel" of the application that is rendered in HTML to the requesting customer. In one embodiment, the cache timeout may be set to 60 minutes.

The implementation of the cache timeout in embodiments of the invention allows for both performance and resiliency of the web application 114. This is because the web application 114 can rely on locally-cached versions of skin file 115 without having to make a remote request (which can be time-consuming). In addition, the local files are available if the remote skin service 104 is down (fault tolerance in external dependencies). However, the locally-cached files are periodically updated for freshness purposes by use of the timeout setting, thus ensuring that practicality is balanced with remaining current.

If the locally-stored cache file 115 has timed out or if there is no locally-stored cache file available for the determined locale, then the controller fetches the skin file 116 from the remote skin service 104 for the particular locale. When these skin files 116 are received and processed by the web application 114, they are also cached locally 115 at the server 103 for future use.

Embodiments of the web app skinning service thus allow for the look and feel of a web application to remain separate from the development of the application. This also allows for updates to be made to the look and feel files of a web application without a developer of the application having to be involved. For instance, an organization can direct the updates to the look and feel skinning files that are applied to the web applications it hosts that are associated with the organization, without directing the third-party developers of the applications to go back and make the changes. In addition, a consistent branding and internationalization can be easily applied to a hosted web application without the involvement of the third-party developer of the hosted web application. Furthermore, the look and feel development aspects can remain separate from internalization concerns.

Figure 2:
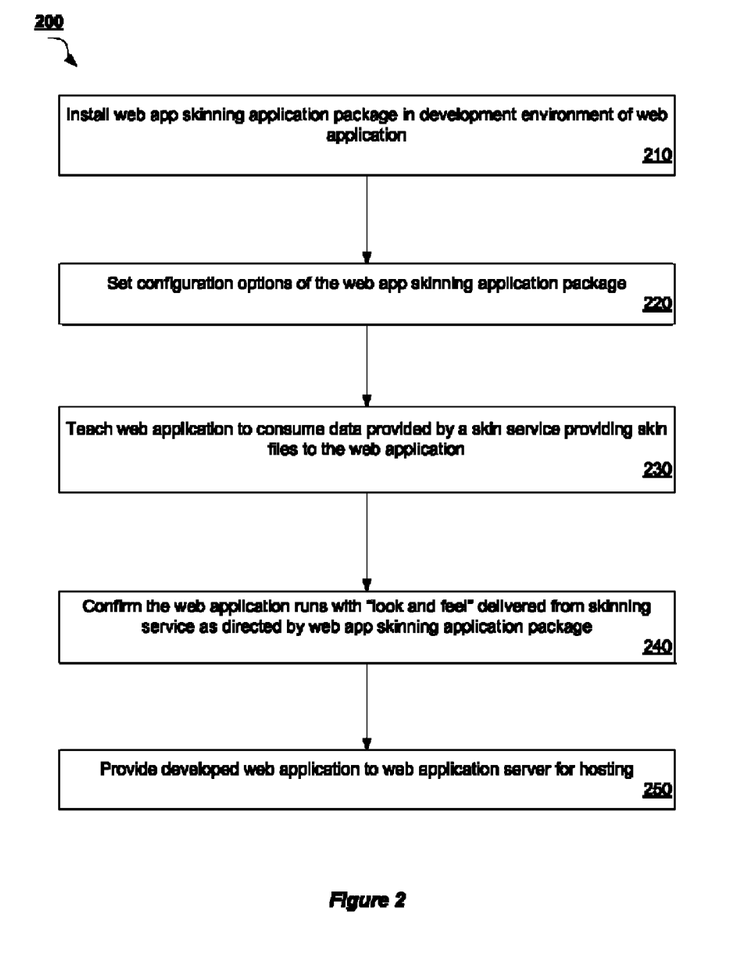
FIG. 2 is a flow diagram illustrating a method for location-aware web service-based application skinning for web applications according to an embodiment of the invention.

FIG. 2 is a flow diagram illustrating a method 200 for location-aware web service-based application skinning for web applications according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by client device 102 of FIG. 1.

Method 200 begins at block 210 where a web app skinning application package is caused to be installed in a development environment of a web application. In one embodiment, the web app skinning application package is a rubygem provided from an RPM system. The development environment may be located in a third-party developer device external to the RPM system, or may be internal to the organization hosting the RPM system. At block 220, configuration options of the web app skinning application package are caused to be set in the development environment of the web application. In one embodiment, the configuration options include contact information of a remote skin service that provides the skin files for the web application. The configuration options may also include a cache timeout option that determines when locally-cached versions of the skin files expire.

At block 230, the web application is taught to consume data provided by the skin service providing the skin files to the application. For example, when building pages in a web application, the pages typically include a header, a body, and a footer. The remote skin service will have a particular way of delivering the skin files for each of those pieces. As a result, the web application is configured to conform to being able to consume the header, body, and footer skinning files as provided by the remote skin service. At block 240, the web application is requested to run in order to confirm that the "look and feel" components of the web application pages are delivered from the remote skin service as directed by the web app skinning application package. If errors occur during this confirmation test run, then the developer should return to the development environment to fix the problems. Otherwise, at block 250, the developed web application is provided to a web application server for hosting purposes.

Figure 3:
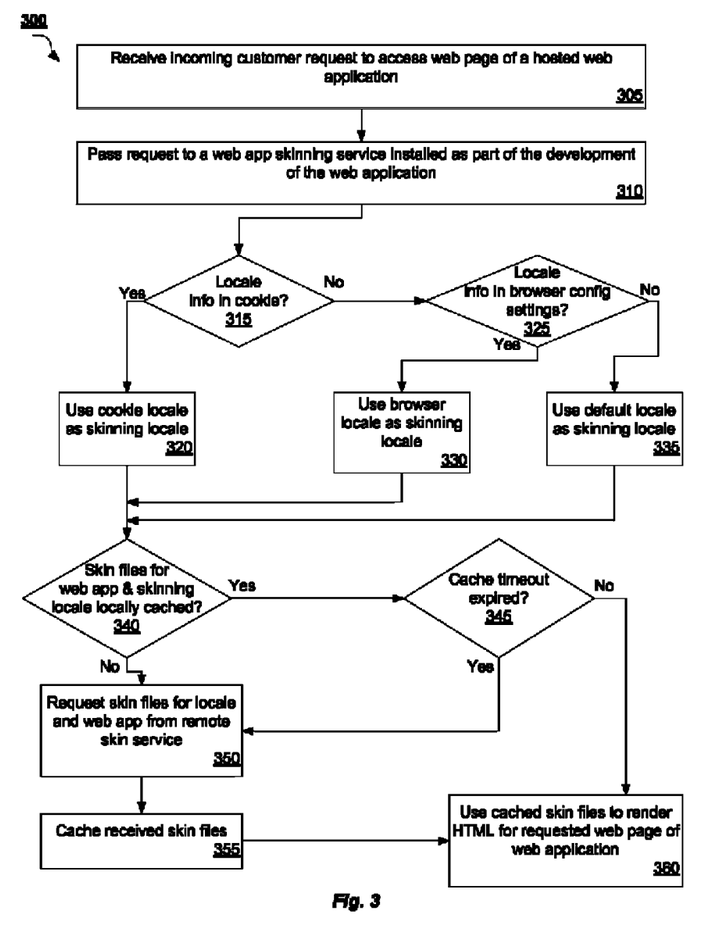
FIG. 3 is a flow diagram illustrating a method for location-aware web service-based application skinning for web applications according to an embodiment of the invention.

FIG. 3 is a flow diagram illustrating a method 300 for location-aware web service-based application skinning for web applications according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by server 103 of FIG. 1.

Method 300 begins at block 310 where an incoming customer request to access a web page of a hosted web application is received. In one embodiment, the request is initially sent to a web application server hosting one or more web applications. The request is directed to a hosted web application indicated in the request, and then an application controller of the web application takes over from there. In one embodiment, the web application is developed outside of the web application server and deployed to the server for hosting purposes.

At block 310, the request is passed to a web app skinning service installed as part of the web application. In one embodiment, the web app skinning service is provided as an application package separate from the development of the web application. A developer installs and configures the web app skinning service in the development environment.

At decision block 315, the web app skinning service determines if a cookie of a web browser sending the request include any locale information. The locale information is a set of parameters describing the language, dialect, and regional preferences of a user of the web browser. In one embodiment, the user may have provided their specific locale preferences in response to a user interface (UI) query provided by the web application. This information may, in turn, have been stored in a cookie of the web browser application. Other well-known means to obtain and store the user local preferences into cookie form are also possible. If the locale information is included in the cookie, then method 300 proceeds to block 320 where the cookie locale data is used as a skinning locale by the web app skinning service.

On the other hand, if the locale information is not included in the cookie, then method 300 continues to decision block 325. At decision block 325, the web app skinning service determines if locale information is included in configuration settings of the browser sending the request. In one embodiment, the browser application has the ability to specify their locale on the client side. This may affect configurations of the browser, such as the language of the browser application and the way web pages are presented by the browser. In addition, on requests made from the browser application to a remote web page, an HTTP 'Accept-Language' header may be appended to the request that includes information about the customer's language preferences. This header may be used to infer a locale of the customer, but should be the last resort for determining locale. This is because a customer may not have changed the defaults for the 'Accept-Language' header options in the browser. Also, the dialect and other regional preferences of a customer cannot be inferred from the language preference. Furthermore, the browser may be executing on a machine that is not the user's machine (e.g., borrowing from a friend, public machine, etc.), and as such may not reflect the particular preferences of the user utilizing the web browser.

If the locale information is provided in the browser configuration settings, then method 300 continues to block 330 where the browser configuration settings locale is used as the skinning locale. On the other hand, if the locale information is not included in the browser configuration settings, then method 300 proceeds to block 335, where a default locale, such as American English, is used as the skinning locale.

From block 320, 330, or 335, method 300 continues to decision block 340. At decision block 340, it is determined whether any skinning files corresponding to the combination of the web app and the skinning locale are locally cached at the web application server. If not, then method 300 continues to block 350 where the skin files for the combination of the locale and web application are requested from a remote skin service. In one embodiment, the remote skin service is identified in the configuration settings of the web app skinning service of the web application. Then, at block 355 these received skin files are locally cached at the web application server. These cached skin files are then used to provide "look and feel", including international aspects such as customized language, to the requested web page that is rendered at block 360.

On the other hand, if the skin files for the combination of the web application and the skinning locale are locally cached at decision block 340, the method 300 proceeds to decision block 345 where it is determined whether a cache timeout period for the cached skin files has expired. In one embodiment, data indicating when the skin files were cached is utilized to determine a length of time the files have been cached. This length of time is compared to a configuration setting of the web app skinning service that determines how long a file can be cached before it should not be used by the web app skinning service. If the skinning files have exceeded the cache timeout period, then method 300 proceeds to blocks 350 and 360, as described above.

If the cache timeout period for the cached skin files has not expired at decision block 345, then method 300 proceeds to block 360 to utilize the cached skin files to provide "look and feel", including international aspects such as customized language, to the requested web page that is rendered.

Figure 4:
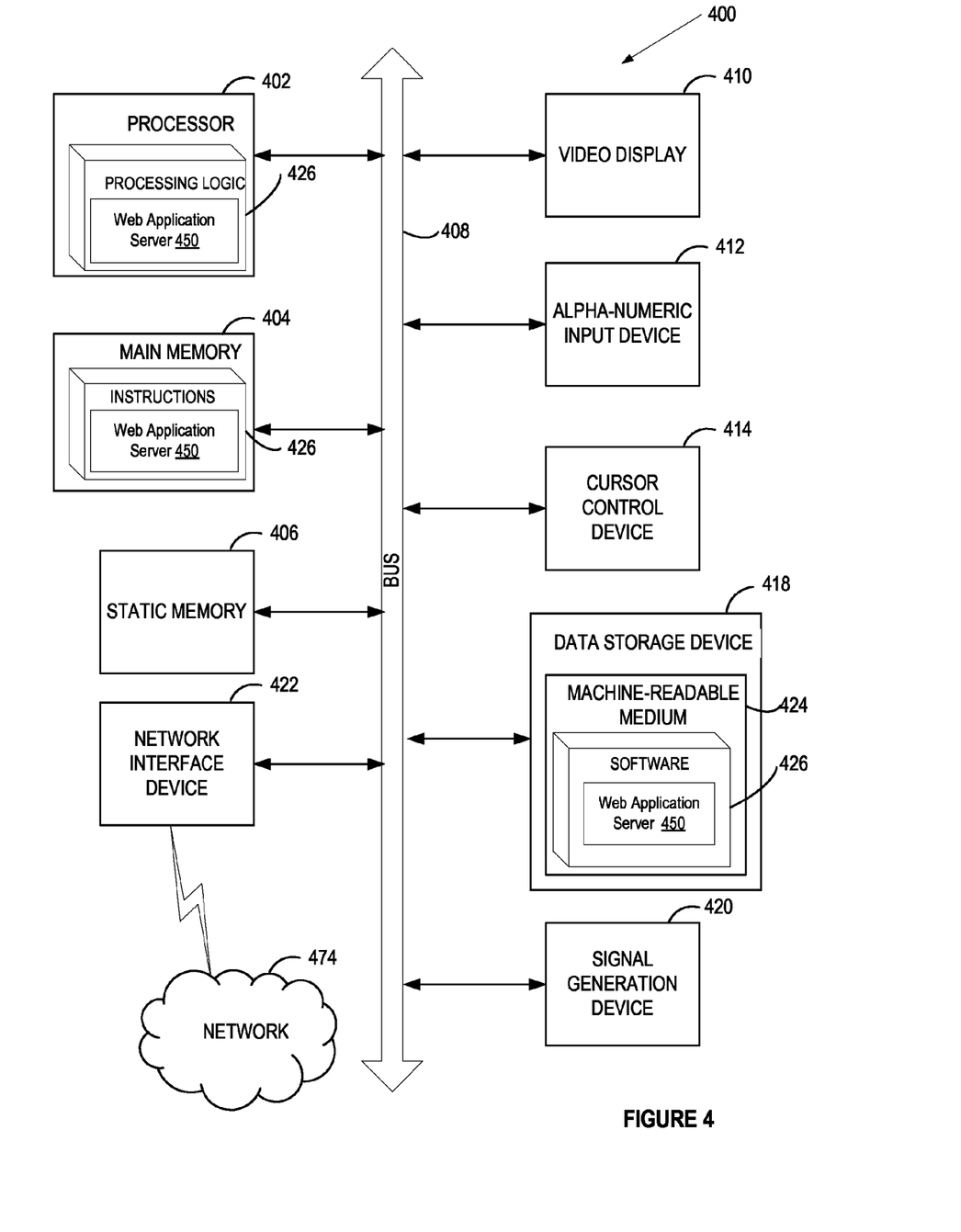
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein, illustrated in FIG. 4 by depicting instructions 426 within processor 402.

The computer system 400 may further include a network interface device 422. The computer system 400 also may include a video display unit 410 (e.g., a liquid crystal display (LCD), a cathode ray tube (CRT), or a touchscreen), an alphanumeric input device 412 (e.g., a keyboard), a cursor control device 414 (e.g., a mouse), and a signal generation device 420 (e.g., a speaker).

The data storage device 418 may include a machine-readable storage medium 424 (also known as a computer-readable storage medium) on which is stored software 426 (e.g., one or more sets of instructions, software, etc.) embodying any one or more of the methodologies or functions described herein. The software 426 may also reside, completely or at least partially, within the main memory 404 (e.g., instructions 426) and/or within the processor 402 (e.g., processing logic 426) during execution thereof by the computer system 400, the main memory 404 and the processor 402 also constituting machine-readable storage media. The software 426 may further be transmitted or received over a network 474 via the network interface device 422.

In one embodiment, the software 426 include instructions for a web application server 450 hosting web applications executing web app skinning services, which may correspond to server 103 of FIG. 1, and/or a software library containing methods that call the server for locale-aware web application skinning services. While the machine-readable storage medium 424 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    identifying, by a processing device of a server device, a locale of an originator of a request for a web page of a web application hosted by the server device;
    obtaining skinning files associated with a combination of the web application and the identified locale, the obtaining further comprising:
        determining whether the skinning files corresponding to the combination of the web application and the identified locale are cached locally in the server device;
        when the skinning files are cached locally, determining whether a local cache of the skinning files complies with a configurable timing policy associated with a web skinning service of the skinning files; and
        identifying a location to obtain the skinning files in view of the determining whether the skinning file are cached locally and in view of the determining whether the local cache complies with the configurable timing policy; and
    rendering, in response to the request, the web page comprising the skinning files, wherein the skinning files provide a language and style to a user interface (UI) of the web page in view of the identified locale, and wherein the skinning files are generated separate from a development of the web application.

2. The method of claim 1, wherein the locale is a combination of language, dialect, and regional preferences of the originator.

3. The method of claim 1, wherein the web application skinning service is installed in the web application during development of the web application.

4. The method of claim 3, wherein the web application skinning service is installed from a rubygem provided from a Red Hat™ package management (RPM) system.

5. The method of claim 1, wherein identifying the locale of the originator of the request further comprises:
    when a cookie of a browser application sending the request comprises locale information of the browser application, using the locale information contained in the cookie as the identified locale;
    when the cookie does not comprise the locale information of the browser application and when configuration settings of the browser application do comprise the locale information of the browser application, using the location information of the configuration settings as the identified locale; and
    when neither the cookie nor the configuration settings comprise the locale information of the browser application, using a default locale as the identified locale.

6. The method of claim 1, wherein the determining whether the local cache of the skinning files complies with the configurable timing policy further comprises, when the skinning files are locally cached:
    determining whether a cache timeout period associated with the cached skinning file is expired, wherein the cache timeout period is indicated in the configurable timing policy;
    when the cache timeout period is expired:
        obtaining the skinning files from a remote skinning service;
        caching the obtained skinning files locally at the web application server; and
        using the cached skinning files to apply to the web page in order to render the web page; and
    when the cache timeout period is not expired, using the cached skinning files to apply to the web page in order to render the web page.

7. The method of claim 1 further comprising, when the skinning files are not locally cached:
    obtaining the skinning files from a remote skinning service;
    caching the obtained skinning files locally at the web application server; and
    using the cached skinning files to apply to the web page in order to render the web page.

8. A system, comprising:
    a memory; and
    a processing device, communicably coupled to the memory;
    a web application skinning service executable from the memory by the processing device, the web application skinning service to:
        identify a locale of an originator of a request for a web page of a web application associated with the web application skinning service; and
        obtain skinning files associated with a combination of the web application and the identified locale, the obtaining further comprising:
            determining whether the skinning files corresponding to the combination of the web application and the identified locale are cached locally in the server device;
            when the skinning files are cached locally, determining whether a local cache of the skinning files complies with a configurable timing policy associated with a web skinning service of the skinning files; and
            identifying a location to obtain the skinning files in view of the determining whether the skinning file are cached locally and in view of the determining whether the local cache complies with the configurable timing policy;
        wherein the skinning files to be applied to the web page in order to render the web page in response to the request, the skinning files providing a language and style to a user interface (UI) of the web page in view of the identified locale, and wherein the skinning files are generated separate from a development of the web application.

9. The system of claim 8, wherein the web application skinning service is installed in the web application during development of the web application.

10. The system of claim 8, wherein the web application skinning service is installed from a rubygem provided from a Red Hat™ package management (RPM) system.

11. The system of claim 8, wherein the web application to identify the locale of the originator of the request further comprises the web application to:
- when a cookie of a browser application sending the request comprises locale information of the browser application, use the locale information contained in the cookie as the identified locale;
- when the cookie does not comprise the locale information of the browser application and when configuration settings of the browser application do comprise the locale information of the browser application, use the location information of the configuration settings as the identified locale; and
- when neither the cookie nor the configuration settings comprise the locale information of the browser application, use a default locale as the identified locale.

12. The system of claim 8, wherein the determining whether the local cache of the skinning files complies with the configurable timing policy further comprises the web application to, when the skinning files are locally cached:
- determine whether a cache timeout period associated with the cached skinning file is expired, wherein the cache timeout period is indicated in the configurable timing policy;
- when the cache timeout period is expired:
  - obtain the skinning files from a remote skinning service;
  - cache the obtained skinning files locally at the web application server; and
  - use the cached skinning files to apply to the web page in order to render the web page; and
- when the cache timeout period is not expired, use the cached skinning files to apply to the web page in order to render the web page.

13. The system of claim 8, wherein the web application further to, when the skinning files are not locally cached:
- obtain the skinning files from a remote skinning service;
- cache the obtained skinning files locally at the web application server; and
- use the cached skinning files to apply to the web page in order to render the web page.

14. The system of claim 8, wherein the locale is a combination of language, dialect, and regional preferences of the originator.

15. A non-transitory machine-readable storage medium including instructions that, when accessed by a processing device, cause the processing device to perform operations comprising:
- identifying, by the processing device of a server device, a locale of an originator of a request for a web page of a web application hosted by the server device;
- obtaining skinning files associated with a combination of the web application and the identified locale, the obtaining further comprising:
  - determining whether the skinning files corresponding to the combination of the web application and the identified locale are cached locally in the server device;
  - when the skinning files are cached locally, determining whether a local cache of the skinning files complies with a configurable timing policy associated with a web skinning service of the skinning files; and
  - identifying a location to obtain the skinning files in view of the determining whether the skinning file are cached locally and in view of the determining whether the local cache complies with the configurable timing policy; and
- rendering, in response to the request, the web page comprising the skinning files, wherein the skinning files provide a language and style to a user interface (UI) of the web page in view of the identified locale, and wherein the skinning files are generated separate from a development of the web application.

16. The non-transitory machine-readable storage medium of claim 15, wherein identifying the locale of the originator of the request further comprises:
- when a cookie of a browser application sending the request comprises locale information of the browser application, using the locale information contained in the cookie as the identified locale;
- when the cookie does not comprise the locale information of the browser application and when configuration settings of the browser application do comprise the locale information of the browser application, using the location information of the configuration settings as the identified locale; and
- when neither the cookie nor the configuration settings comprise the locale information of the browser application, using a default locale as the identified locale.

17. The non-transitory machine-readable storage medium of claim 15, wherein the determining whether the local cache of the skinning files complies with the configurable timing policy further comprises, when the skinning files are locally cached:
- determining whether a cache timeout period associated with the cached skinning file is expired, wherein the cache timeout period is indicated in the configurable timing policy;
- when the cache timeout period is expired:
  - obtaining the skinning files from a remote skinning service;
  - caching the obtained skinning files locally at the web application server; and
  - using the cached skinning files to apply to the web page in order to render the web page;
- when the cache timeout period is not expired, using the cached skinning files to apply to the web page in order to render the web page.

18. The non-transitory machine-readable storage medium of claim 15, further comprising, when the skinning files are not locally cached:
- obtaining the skinning files from a remote skinning service;
- caching the obtained skinning files locally at the web application server; and
- using the cached skinning files to apply to the web page in order to render the web page.

19. The non-transitory machine-readable storage medium of claim 15, wherein the web application skinning service is installed in the web application during development of the web application.

20. The non-transitory machine-readable storage medium of claim 15, wherein the locale is a combination of language, dialect, and regional preferences of the originator.

* * * * *